March 8, 1966 R. E. TYNER 3,239,326
TUBE MECHANISM FOR GLASS GOB FEEDER
Filed Dec. 10, 1962 5 Sheets-Sheet 1
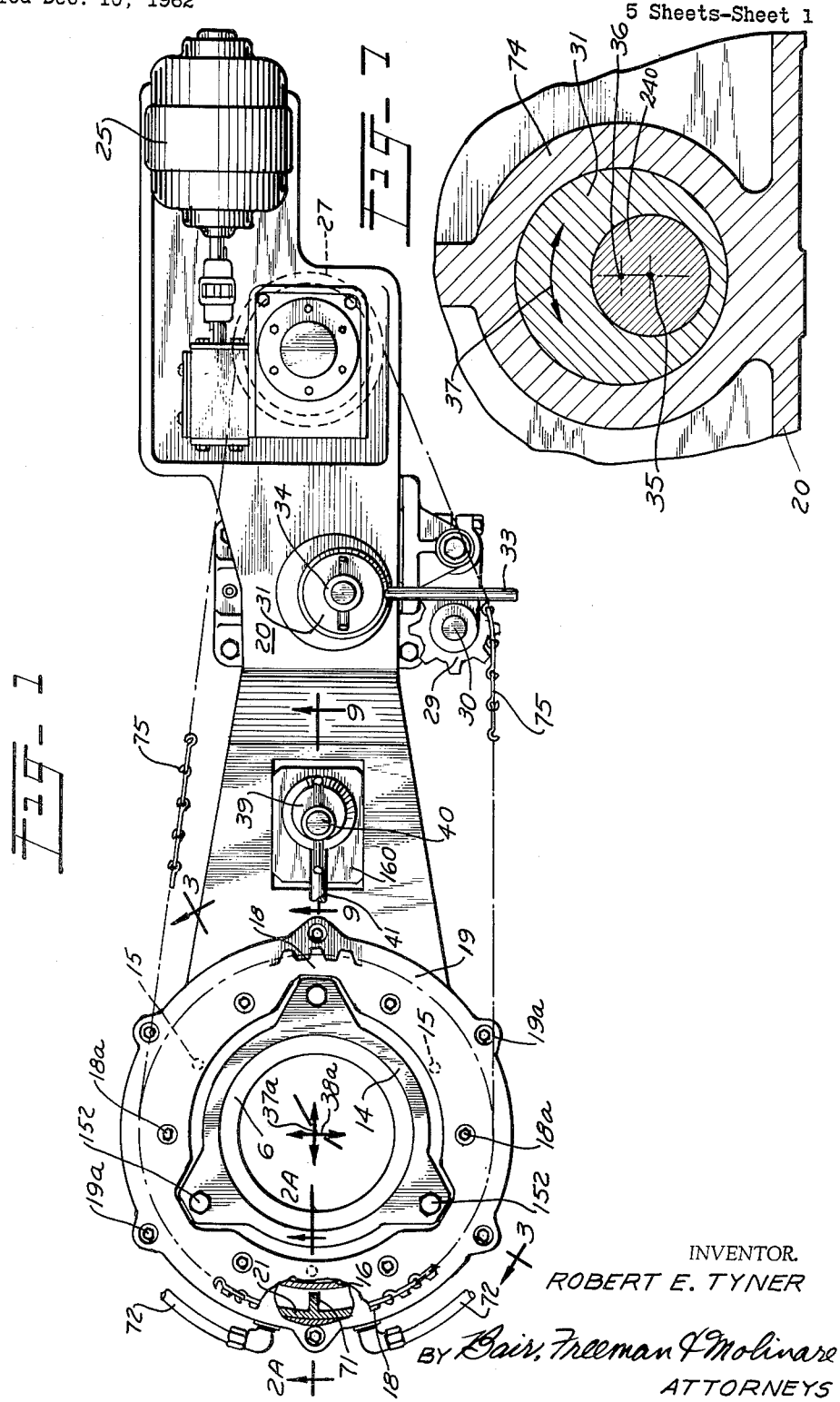
INVENTOR.
ROBERT E. TYNER
BY Bair, Freeman & Molinare
ATTORNEYS March 8, 1966
R. E. TYNER
3,239,326
TUBE MECHANISM FOR GLASS GOB FEEDER
Filed Dec. 10, 1962
5 Sheets-Sheet 2
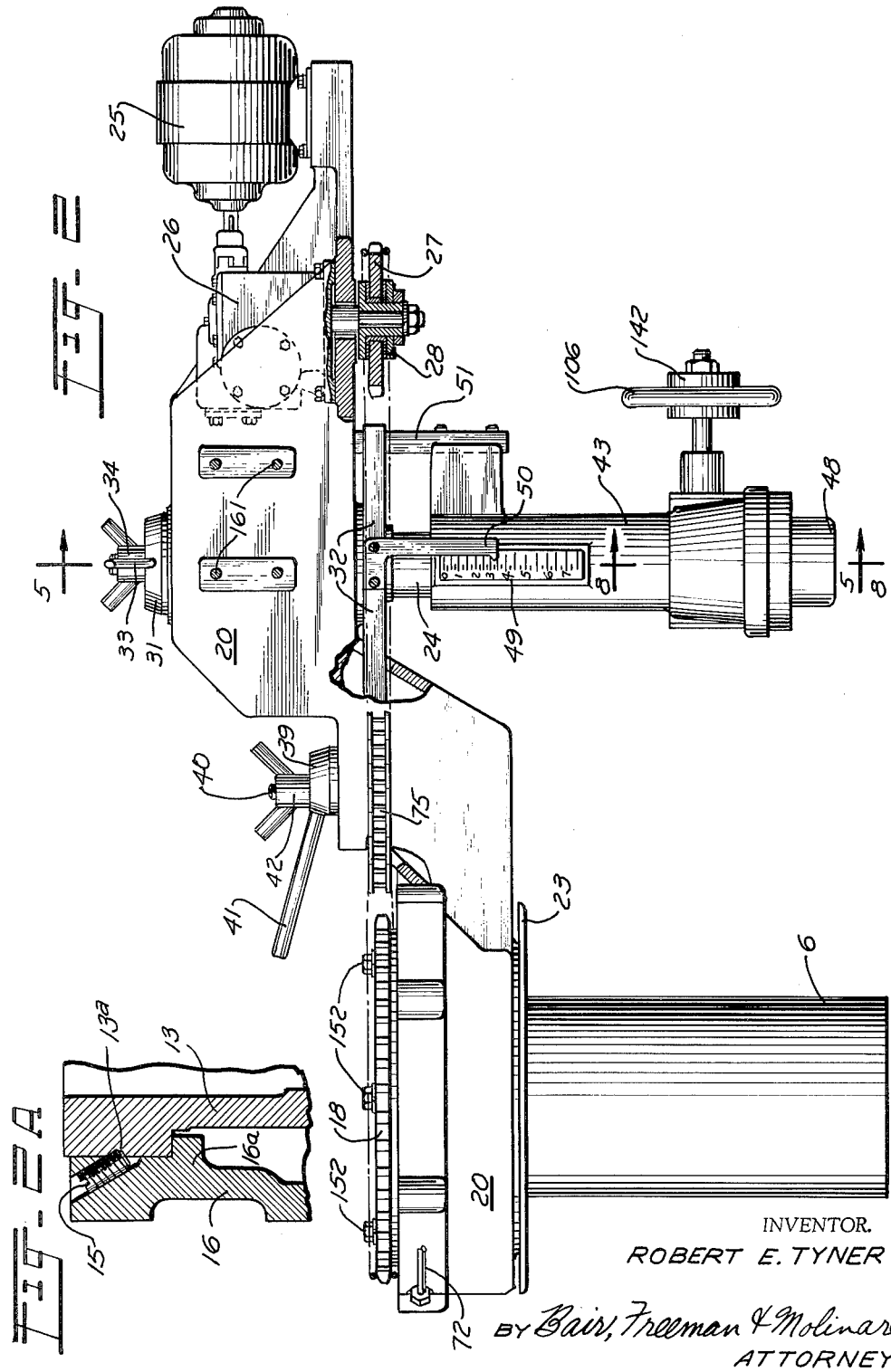
INVENTOR.
ROBERT E. TYNER
BY Bair, Freeman & Molinare
ATTORNEYS

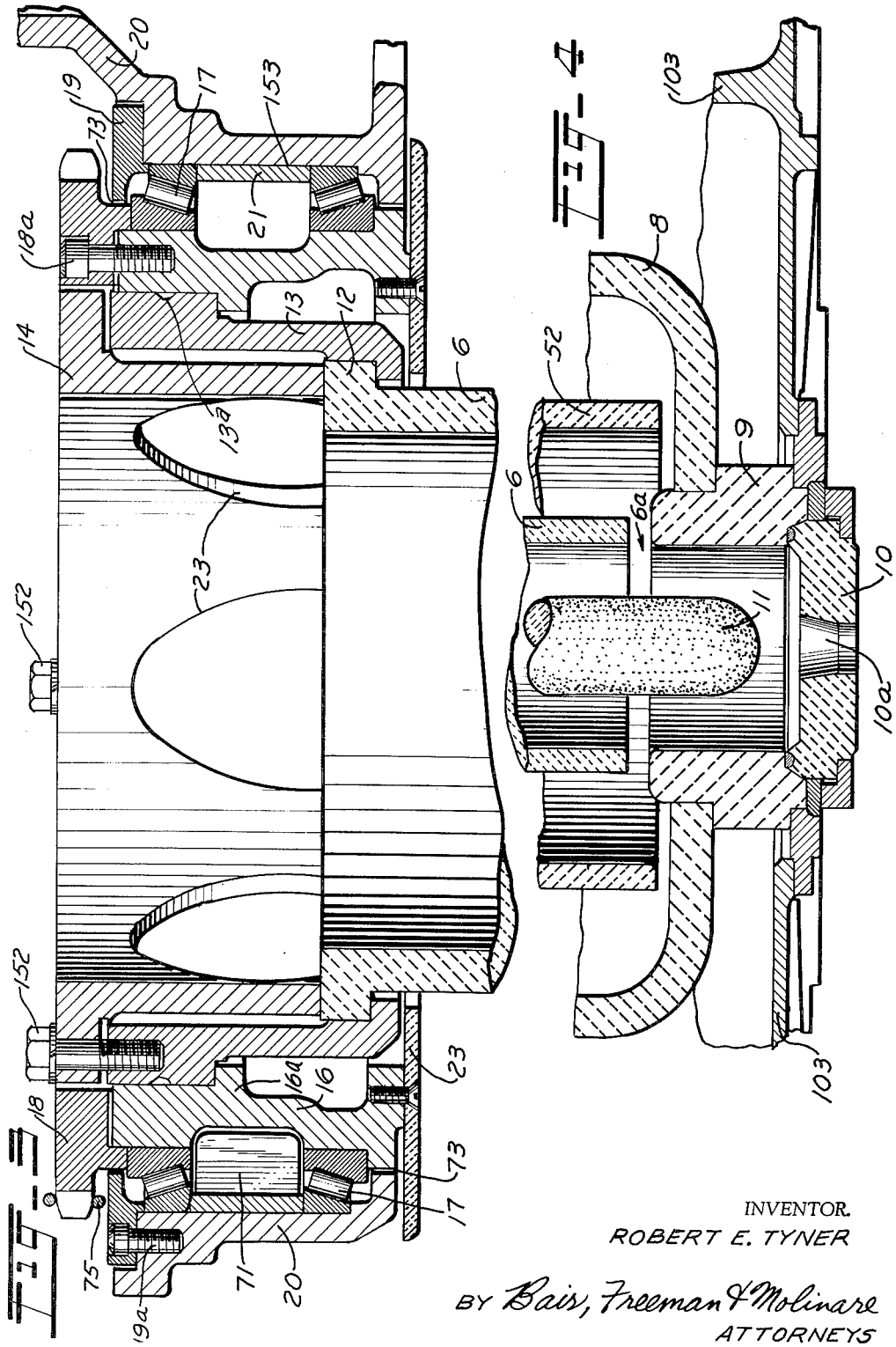

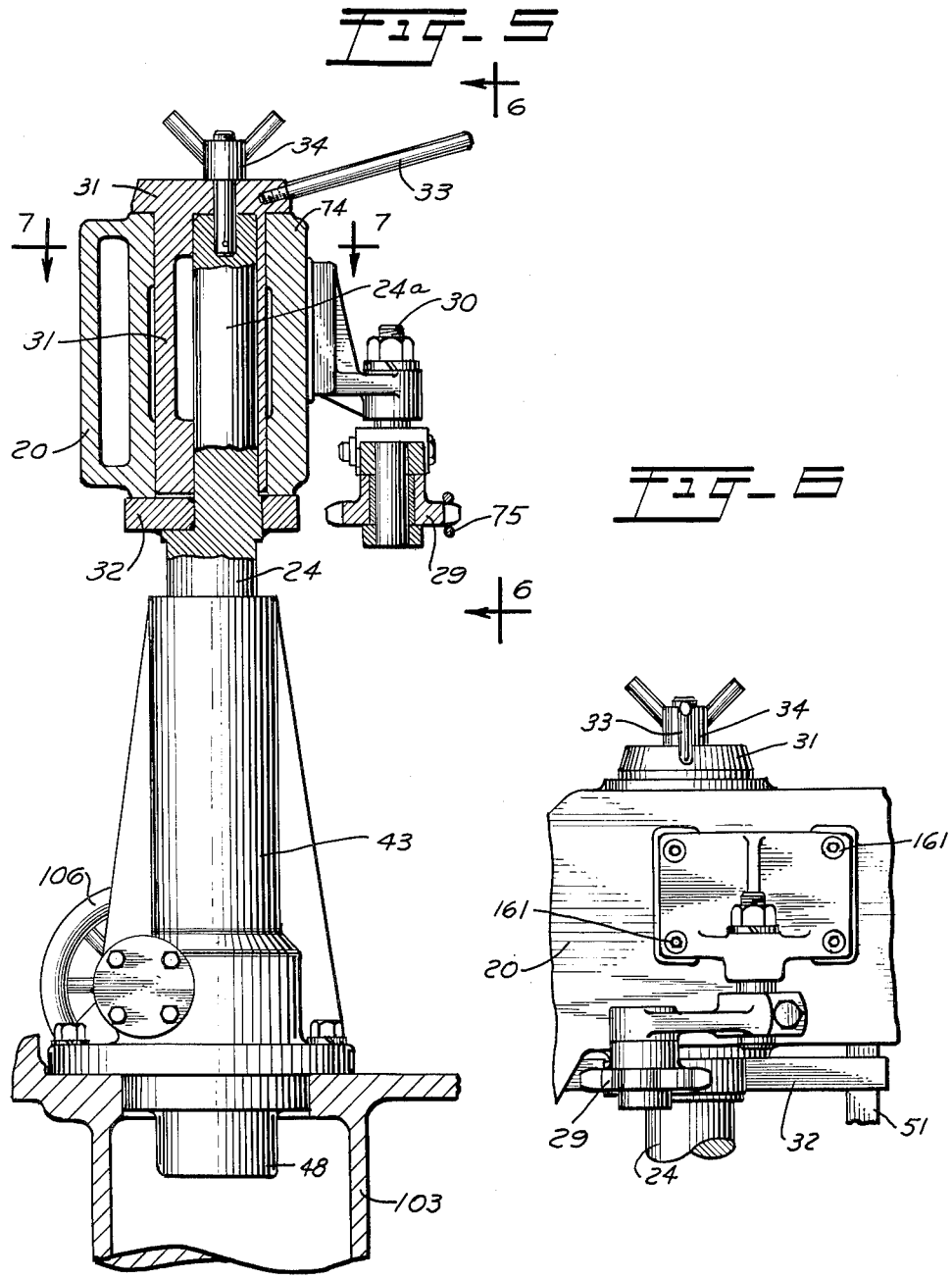

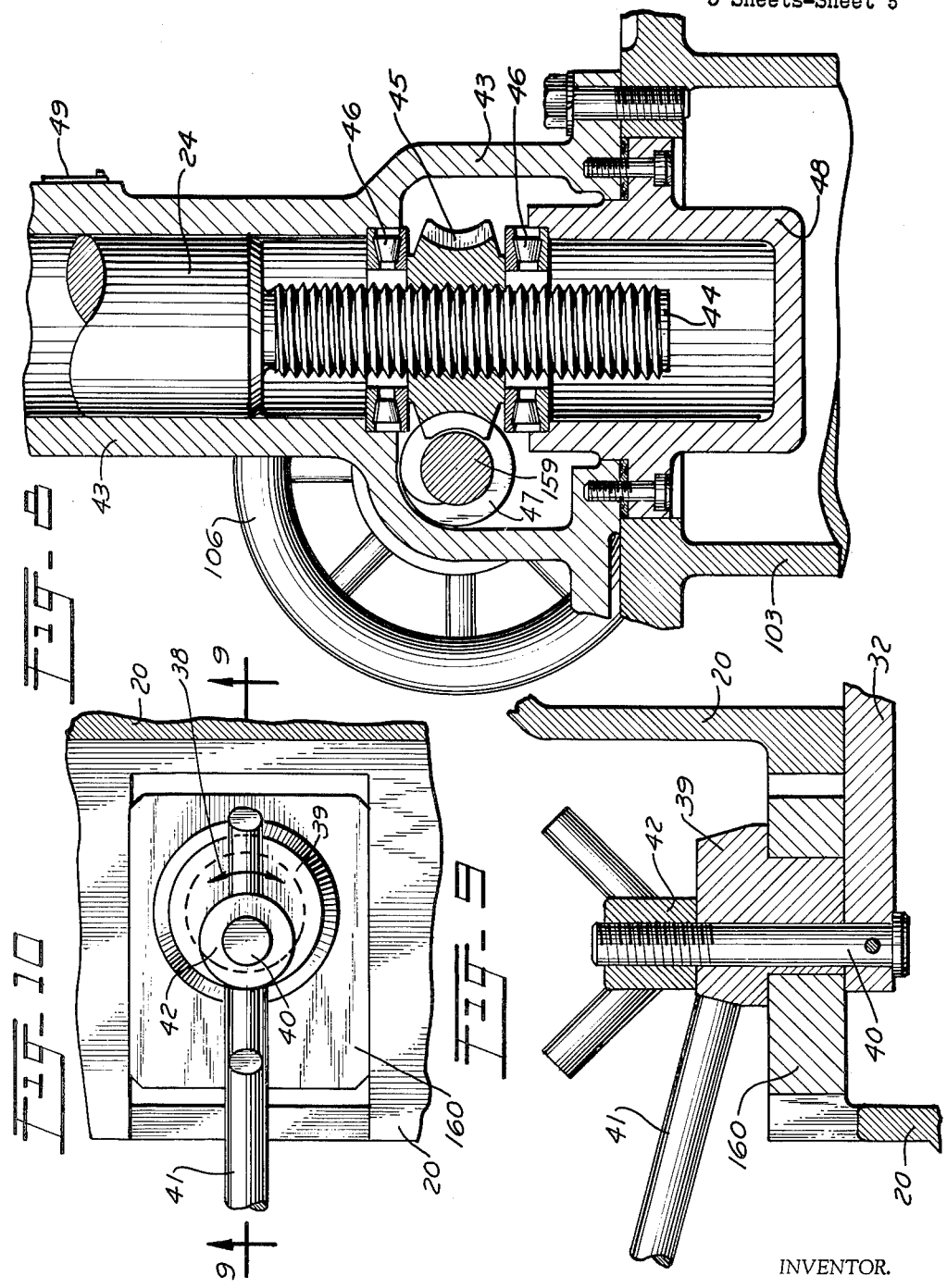

United States Patent Office 3,239,326
Patented Mar. 8, 1966

3,239,326
TUBE MECHANISM FOR GLASS GOB FEEDER
Robert E. Tyner, Toledo, Ohio, assignor to Lynch Corporation, Anderson, Ind., a corporation of Indiana
Filed Dec. 10, 1962, Ser. No. 243,236
2 Claims. (Cl. 65—330)

This invention relates to a tube mechanism for a glass gob feeder.

A glass gob feeder receives molten glass from a forehearth and by action of its components, forms the molten glass into gobs of suitable size, weight and shape for use by a glass ware forming machine. In general, such a feeder is made up of four major components of subassemblies as follows:
(1) Tube mechanism (the present invention being a disclosure thereof)
(2) Plunger mechanism (disclosed in my copending application Serial No. 258,988, filed February 18, 1963)
(3) Feeder bowl
(4) Shear mechanism One object of the present invention is to provide a tube mechanism for the feeder bowl of a glass gob feeder in which the tube acts primarily to control gob weight by restricting the flow of glass from the feeder bowl into a cavity around the plunger and above an orifice.

Another object is to provide a tube which creates better homogeneity and a more uniform temperature within the mass of glass within the feeder bowl accomplished by rotation of the tube which causes a mixing action within the mass of molten glass.

Still another object is to provide a mechanical structure supporting the tube including a first means to adjust the tube up and down, and a second means to adjust it horizontally in all possible directions so as to center it with respect to the other elements of the feeder bowl.

A further object is to provide a mounting for the tube which is much more stable and rigid than present day mountings, and is less likely to permit weave of the bottom end of the tube which results in gob weight variations.

Still a further object is to provide a tube and mounting therefor which reduce maintenance and promote more accurate control of gob weight.

An additional object is to provide a bearing arrangement for the tube which permits an efficient cooling thereof by the introduction of air under pressure thereto.

With these and other objects in view, my invention consists in the construction, arrangement and combination of the various parts of my tube mechanism, whereby the objects above contemplated are attained, as hereinafter more fully set forth, pointed out in my claims and illustrated in detail on the accompanying drawings, wherein:

FIG. 1 is a plan view of a tube mechanism embodying my invention;

FIG. 2 is a side elevation thereof with portions broken away and other portions shown in section;

FIG. 2A is a fragmentary enlarged vertical sectional view on the line 2A—2A of FIG. 1;

FIG. 3 is an enlarged vertical sectional view on the line 3—3 of FIG. 1 showing only the upper portion of the tube and the bearing mechanism for supporting the tube;

FIG. 4 is a similar sectional view showing, on a reduced scale, only the lower portion of the tube and the associated feeder bowl;

FIG. 5 is an enlarged vertical sectional view on the line 5—5 of FIG. 2;

FIG. 6 is a side elevation of the upper portion of FIG. 5 on the indicated line 6—6 thereof;

FIG. 7 (on sheet 1) is an enlarged horizontal section on the line 7—7 of FIG. 5;

FIG. 8 is an enlarged vertical section on the line 8—8 of FIG. 2;

FIG. 9 is an enlarged vertical section on the line 9—9 of FIG. 1, and

FIG. 10 is a plan view of FIG. 9.

On the accompanying drawings I have used the reference numeral 6 (see FIGS. 2, 3 and 4) to indicate a tube of the kind suitable for operation in a glass gob feeder which is formed of a suitable ceramic and extends downwardly through the surface of the molten glass contained within a feeder bowl 8. The tube 6 is directly overhead with respect to a a tubular spout section 9 shown in FIG. 4 which connects the feeder bowl 8 with an orifice bushing 10. A plunger 11 is also shown just above the orifice 10a in the orifice bushing 10.

The primary purpose of the tube 6 is to control glass gob weight. The means by which the gob weight is controlled is primarily in the vertical adjustment of the tube 6. Such adjustment creates an opening between the lower end of the tube and the spout 9 (identified at 6a in FIG. 4) which permits glass to flow from the feeder bowl 8 into the cavity inside the tube and spout and above the orifice 10a. By varying the height of the tube with respect to the spout 9, the restrictive effect on the flow of glass to the orifice is varied, thus varying gob weight.

It is also necessary that the tube be concentric with respect to the spout 9 and on center with respect to the orifice 10a of the bushing 10. This centering is necessary in order that the quantity of glass flowing between the tube and spout be equal at all points around the periphery of the tube. Any inequality of glass flow at these points would cause difficulty in gob formation at the orifice bushing 10. For this reason adjustments are provided for centering of the tube with these elements.

As to the mounting of the tube 6, it is clamped between and supported by chucking members 13 and 14 as shown in FIG. 3. These chucking members clamp onto a flange 12 at the top end of the tube, three clamp screws 152 being provided for this purpose. The tube may be different sizes, such as 5", 7" or 9" inside diameter (a 9" tube is shown) but the flange 12 remains the same size as does the chucking members 13 and 14. The outer chucking sleeve 14 fits into a rotary sleeve 16 which is supported on the inner races of roller bearings 17. By maintaining close fits between each of these parts, the tube 6 is held directly on center of the bearing 17.

The means of holding chucking member 14 securely in the rotary sleeve 16 is shown in FIG. 2A. It comprises three set screws 15 threaded in the rotary sleeve 16 which are pointed downwardly at a slight angle off the vertical such that they can be tightened against a groove 13a provided in the sleeve 13. This will lock the member 13 downward against a shoulder 16a of the sleeve 16 so that no vertical movement is possible, and the diametrical fit between the member and sleeve will assure centering and alignment.

The bearings 17 are mounted in a bore 153 of a main casting 20 as by clamping the outer bearing races under a ring 19 by means of six screws 19a, with a spacer sleeve 21 between them. The inner races are preloaded by the bolting at 18a of a sprocket 18 to the rotary sleeve 16.

For cooling the bearing 17, blow air is introduced into an annular cooling cavity between the rotary sleeve 16 and the spacer sleeve 21. This portion of the bearing case is directly above the molten glass and is subject to a considerable amount of both conductive and radiant heat. Therefore the circulation of cooling wind through these bearings is necessary to maintain their temperature sufficently low so that the lubricating oil with which they are supplied will not be broken down and become gummy.

Referring to the left side of FIG. 1, a portion of the sprocket 18 is broken away and the rotary sleeve 16 therebelow is shown in section. A stationary baffle partition 71 extends inwardly from the spacer 21 and a pair of blow air connections 72 enter the annular cooling cavity on opposite sides thereof. This air travels around the cavity and escapes to atmosphere past the bearings 17, and finally through annular slots 73 above the upper bearing and below the lower bearing as shown in FIG. 3.

The chucking member 13 is also provided with openings 23 in order to allow air circulation about the chuck parts and thus assist in keeping these parts cooler. A baffle disc 23 of heat insulating material may be provided as an additional insulation from the heat and in particular as a baffle against the sting-out gases which issue from the top of the feeder bowl.

The main casting 20 as shown in FIGS. 1 and 2 extends toward the right from the tube 6 in the form of an arm which has a hub 74 (see FIG. 7) supported by a shaft 24. On the opposite side of the supporting shaft 24 from the tube bearing assembly is a variable speed motor 25 (see FIGS. 1 and 2) which drives a gear reducer 26, the output shaft from which drives a sprocket 27 through a slip clutch 28. The slip clutch is a friction disc type which is adjustable and may be set to slip at any desired torque rating. A drive chain 75 operatively connects the drive sprocket 27 to the driven sprocket 18 on the rotary sleeve 16 which supports the tube 6. An idler sprocket 29 has the chain also cooperating with it and pivots and clamps about a stationary shaft 30 in order to keep the drive chain tight at all times.

This drive arrangement permits variation of tube speeds in the range of 0 to 10 r.p.m., and the slip clutch 28 prevents tube breakage under unusual load conditions. In particular, when the tube is lowered to seat against the spout 9 to shut off the flow of glass from the feeder when shut down, the glass freezes at the joint between the spout and tube and this frozen glass is strong enough to cause the driving torque to break the tube if a slip clutch were not provided in the drive chain. In addition, the tube when rotating in normal operation will sometimes contact large stones, brick pieces, or other such elements which will tend to hang up on the tube and could cause its breakage were it not for the slip clutch.

The supporting hub 74 of the body casting 20 of my tube mechanism is supported by a shoulder plate 32 welded to the supporting shaft 24. Within the hub and surrounding the shaft is an eccentric sleeve 31 (see FIGS. 5 and 7). A handle 33 extends from the eccentric sleeve. Upon loosening a lock nut 34, the eccentric bushing 31 may be rotated by using the handle 33. The inside and outside diameters of the eccentric bushing 31 are approximately ½" off center and therefore as this bushing is rotated (the supporting shaft 24 remaining stationary), the hub 74 of the body casting 20 is forced to shift laterally with the center of the outside diameter of the eccentric bushing as indicated by the arrow 37 in FIG. 7, the resultant direction of adjustment being also shown at 37a at the center of the tube 6 in FIG. 1. These parts are arranged with the supporting shaft 24 centered at 35 and the hole bored in the hub 74 centered at 36. Rotation of the eccentric bushing 31 moves the center 36 in an arc about center 35 as indicated by the arrow 37, causing movement of the tube center in the direction noted at 37a. The eccentric bushing need only be rotated approximately 30° either side of the position shown in order to accomplish the amount of adjustment 37a necessary at the tube center (½" maximum). The form of the adjustment 37a is not a straight line as shown but a slightly curved line. This is due to the fact that point 36 moves in an arc about point 35 during its adjustment and this combined with pivoting action of the casting 20 about an eccentric bushing 39 shown in FIGS. 1, 9 and 10 causes the adjustment of the tube center in the direction 37a to vary slightly from a straight line. However due to the small amount of the adjustment necessary the amount of variation from a straight line is not detrimental and can be compensated for by another adjustment indicated by an arrow 38a. The adjustment of the tube center in the direction 38a is at right angles to the adjustment direction 37a and therefore permits adjustment of the tube to any position within approximately ½" radius. Thus practically any conditions of misalignment of the plunger 6 with the feeder bowl 8, spout 9 or orifice 10a can be compensated for.

As to the details for the adjustment indicated at 38a, this is accomplished by rotation of the eccentric bushing 39, the diameter of which is approximately ¼" off center with respect to the diameter of a pin 40 which is secured to the shoulder plate 32 and has a lock nut 42 screwed thereon. The bushing 39 is rotatable in a slide block 160 of the casting 20. As the eccentric bushing 39 is rotated as indicated by the arrow 38 in FIG. 10, the casting 20 is forced to move due to a pivoting action about center 36. The pin 40 is approximately one-half the distance between the center 36 and the center of the tube 6, and therefore the movement of the tube center is approximately twice the amount of the adjustment at pin 40. The form of the adjustment is an arc about center 36 rather than a straight line. Due to the small amount of adjustment required at the center of the tube 6 and due to the large radius from the center of the tube to the center 36, the amount that the arc varies from a straight line is negligible.

The shoulder plate 32 with which the pin 40 is connected is welded to the supporting shaft 24 so that it cannot rotate about the axis of the pin. Upon completion of all adjustments the lock nuts 34 and 42 are retightened in order to fix the tube in the adjusted position.

The height adjustment for the tube 6 is shown in FIG. 8. The shaft 24 which supports the casting 20 and the tube 6 and related parts is housed and guided in a postlike casting 43. This casting is in turn fastened to the top of a supporting casing 103 for the feeder bowl 8 as shown in FIGS. 4 and 5. A threaded member 44 projects from the lower end of the shaft 24 and is threaded into a worm gear 45. The worm gear 45 is supported for rotation between thrust bearings 46, and is caused to rotate in the bearings by a worm 47. Rotation of the worm 47 causes slow-speed rotation of the worm gear 45 which in turn causes the shaft 24 to raise or lower in accordance with the threaded engagement between the threaded member 44 and the worm gear. This worm jack type of arrangement permits adjustment of the tube height and thus variation of gob weight as discussed previously. The bearings 46 are supported between the casting 43 and a cover member 48, the bearings being preloaded thereby with the amount of preload being determined by the shimming between the cover member 48 and the casting 43.

The means for lowering and raising the shaft 24 is a hand wheel 106 connected to a shaft 159 for the worm 47. The hand wheel has built into it a slip clutch arrangement 142. This is done so as to limit the amount of force that can be applied to the raising and lowering mechanism for the tube 6 in order to protect the tube from breakage. When a glass gob feeder is in operation and it must be shut down, it is customary first to lower the tube 6 until it contacts the spout 9. This shuts off the flow of glass from the feeder bowl and permits maintenance work. In lowering the tube to this position, it is possible that an undue amount of force could be placed on the tube by the tube height adjustment mechanism causing the tube to fracture or break. To prevent this occurrence the slip clutch is provided. When the feeder mechanism is again ready to begin operation, it is necessary to raise the tube to the proper level for glass flow. However, the glass will have frozen between the tube and spout binding them together and could cause damage to or breakage of the tube were it not for the slip clutch arrangement.

Affixed to the side of the support 43 is a scale 49 (see also FIG. 2) and affixed to the side of the shoulder plate 32 is a pointer 50. The scale and pointer arrangement provides the means for determining tube height.

Also affixed to the main casting 43 is a guide key 51. This key engages in a slotted opening in the shoulder plate 32. The engagement cooperates with the pin 40 and eccentric bushing 39 to provide the means for stabilizing the body casting 20 of the tube mechanism and preventing it from rotation about the reduced upper end 24a of the supporting shaft 24.

The tube 6 shown in FIG. 4 is illustrative of a new tube. After continuous operation in molten glass, the bottom corners of this tube will become rounded and the bottom marginal end of the tube will gradually erode and wear away, making the overall length of the tube shorter. For this reason the threaded member 44 in FIG. 8 is of generous length to provide for a total normal adjustment of about 2½″ to provide the gob weight control desired, and an additional adjustment of about 2″ for tube wear. Thus approximately an inch and a half of the tube can wear off the lower extremity and the tube would still be usable when mounted in my bearing mechanism for supporting the same.

The tube 6 is a ceramic part which, due to the nature of the operation, will need to be changed from time to time. Because this change may be necessary during a period when hot molten glass is in the glass gob feeder, it is necessary to preheat the tube to be installed to a temperature of approximately 1500° F. This preheating of the tube combined with its somewhat fragile nature (being of a ceramic material) make it highly desirable that the tube be supported by the chucking members 13 and 14 throughout the preheat and installation of the tube. The use of these chucking members permits handling of the tube with eye bolts, tongs or other such devices without contacting the tube directly itself, thereby minimizing the danger of damage to the tube. Therefore each tube is assembled complete with chucking members 13 and 14 prior to use. A number of chucking members may be provided in a plant for the tube handling periods during a change.

In order to remove and replace a tube, the set screws 15 holding the chucking member 13 in the rotating sleeve 16 are retracted and the tube and its chucks may then be withdrawn vertically upward from its bearing cage and the new tube may be lowered downward into the space just vacated. Tightening of the set screws will then fix the new tube into position.

As mentioned previously, the tubes may be different diameters such as 5, 7 and 9 inches in size. When a tube is changed to a new diameter, it is also necessary that the spout 9 and orifice bushing 10 be changed because these parts must be mutually compatible at all times. Normally the plunger 11 will also be changed; however this is not mandatory. The 5 and 7 inch diameter tubes are available on present day equipment. An objective of my design is to provide increased capacity over existing equipment and it is due to this necessity, to increase capacity, that the 9″ tube is provided.

As mentioned previously the rotation of the tube 6 is provided in order to stir or mix the glass with the resultant effect being a more homogeneous mass of glass at a more uniform temperature. However the rotation of the tube causes additional problems in present day feeders. Primary amongst these is that the glass being a viscous, heavy substance tends to be dragged with the surface of the tube, and whenever there is a cold spot or restriction to its movement, the glass will tend to "stack up" at that point. This stack-up of the molten glass results in a higher head of glass at that particular point and will affect the feeding operation accordingly. An example is that during double gobbing operation, if this should happen at a position above or adjacent one of the two orifices, that orifice will feed more glass than the other orifice. This would be very detrimental since the bottles formed from that orifice would be too heavy. A secondary problem with tube rotation is the necessary maintenance of the bearings and drive elements. Due to severe heat conditions frequent maintenance of these parts is required. It would therefore be very desirable to eliminate the rotation of the tube, if at all possible. To this end, certain design provisions with respect to the feeder bowl (which is not part of my present invention) permit the tube to be stationary. A sleeve 52 (see FIG. 4) provided around the tube 6 will equalize the flow of glass between the tube and spout at all points, thus causing the end of the tube to wear evenly. This is desirable since it was found from previous applications wherein the tube was not rotated that it would tend to wear unevenly. The side facing the forehearth wears the greatest amount, and the side away from the forehearth the least amount, resulting in poor gob weight and shape control and inability to shut off glass flow.

In some cases it may be found desirable to rotate the tube while in other cases rotation may be dispensed with. In regard to the non-homogeneity of the glass, it has been found that with temperature uniformity, these effects are minimized or eliminated to a great extent. However the presence of cords, stones, etc. in the glass are caused by many factors and when encountered may call for rotation.

The foregoing disclosed tube mechanism provides more uniform gob weights, gob temperatures and gob shapes, particularly at high speeds. Bottle manufacturers are continually requiring more accurate control of gob weights, temperature and shape in order to produce lighter-weight bottles with thinner but more uniform wall weights. Prior art feeding equipment is taxed to its limit to consistently provide these gob characteristics, particularly at higher speeds. The design of my tube mechanism is such as to provide better and more accurate control of these gob characteristics.

In order to fill the objectives just mentioned, means for mounting a 5″ and 7″ tube is provided which is equivalent to prior art feeder equipment. However provisions have also been made for mounting a 9″ tube on this same means which is primarily useful toward increasing the glass gob feeder capacity. The tube is mounted in a much more stable and rigid bearing arrangement which is less likely to permit weave of the bottom end of the tube. Instability of the tube causes gob weight variations and this problem is experienced in the prior feeder equipment. Rotation of the tube in some instances may be eliminated and will reduce maintenance and promote more accurate control of gob weight.

The body casting 20 serves as an arm-like support for the tube 6 as shown in FIG. 2 and extends in both directions from the supporting post 43 on which it is pivoted. Accordingly the motor 25 and the gear reducer 26 balance the chucking and bearing mechanisms, thereby eliminating undue strain on the parts. The tube 6 when thus supported, may be nicely adjusted in the direction of the arrow 38a by means of the eccentric 39 and/or adjusted in the direction of the arrow 37a by the eccentric 31, both of which are easily operable by manipulation of their handles 33 and 41.

The elevation of the lower end of the tube 6 may readily be adjusted with relation to the spout 9 by rotation of the handwheel 106 and the position of the tube indicated on the scale 49 by means of the pointer 50. The tube 6 is so chucked as to be readily removable with the chuck members so that another tube and chuck member may be replace it whenever required. These features provide a quickly adjustable tube supporting mechanism which minimizes the operator's time for adjustment and for replacement.

The shoulder plate 32 acts as a stabilizing arm to prevent rotation of the shaft 24 by coaction of its slot with the key 51 and by mounting the pin 40 therein.

Some changes may be made in the construction and arrangement of the parts of my tube mechanism for glass gob feeders without departing from the real spirit and purpose of my invention, and it is my invention to cover by my claims any modified forms of structure or use of mechanical equivalents which may reasonably be included within their scope.

I claim as my invention:

1. In a tube mechanism for a glass gob feeder, a vertical supporting post located to one side of a glass gob feeder bowl, a supporting shaft extending upwardly therefrom, a horizontal extension from said shaft, a vertical pin carried thereby, a tube supporting arm mounted on said supporting shaft and extending horizontally therefrom in a direction toward said pin, said arm having a portion surrounding said pin and movable longitudinally of the arm relative to the pin, means for mounting a tube on said arm adjacent an end thereof, and a pair of eccentrics for adjusting said tube supporting arm rotatably about said supporting shaft and longitudinally of the arm for horizontally positioning the lower end of said tube relative to a glass gob feeder bowl spout, one of said eccentrics being rotatable on said pin and the other eccentric being rotatable on said supporting shaft, said one of said eccentrics having its center offset longitudinally of said arm for adjusting said arm about said supporting shaft as a pivot upon rotation of the eccentric, the other of said eccentrics having its center offset laterally of said arm for adjusting the arm longitudinally upon rotation of the eccentric, said one of said eccentrics being also rotatable to compensate for the curved path of adjustment of said tube by said other of said eccentrics.

2. In a tube mechanism of the character disclosed, a vertical supporting shaft located to one side of a glass gob feeder bowl, a horizontally arranged tube supporting arm pivoted on said supporting shaft and extending radially therefrom, means for mounting a tube on said tube supporting arm, and means for adjusting said tube supporting arm for positioning the lower end of said tube horizontally relative to a glass gob feeder bowl spout comprising an eccentric bushing on said supporting shaft, rotatable in said arm and offset laterally thereof for moving the arm in a direction longitudinally thereof, a stabilizing arm extending horizontally from said supporting shaft and along said supporting arm, a vertical pin spaced from said shaft and carried by said stabilizing arm, a second eccentric bushing rotatable thereon and offset longitudinally of the arm, and a slide block slidable longitudinally of said tube supporting arm, said second eccentric bushing being rotatable in said slide block for swinging said arm about said first eccentric bushing as a pivot and being also rotatable to compensate for the arc in which said tube is swung by said first eccentric bushing, and clamp means for each of said eccentrics in their adjusted positions.

References Cited by the Examiner
UNITED STATES PATENTS

| | | | |
|---|---|---|---|
| 1,843,248 | 2/1932 | Soubier | 65—331 X |
| 1,852,218 | 4/1932 | Peiler | 65—331 X |
| 2,470,558 | 5/1949 | Honiss | 65—330 X |
| 2,707,354 | 5/1955 | Peiler | 65—330 |
| 2,749,665 | 6/1956 | Peiler | 65—330 |

DONALL H. SYLVESTER, *Primary Examiner.*